US012260745B2

United States Patent
Guenther et al.

(10) Patent No.: US 12,260,745 B2
(45) Date of Patent: Mar. 25, 2025

(54) METHOD FOR COMMUNICATION OF AN AT LEAST PARTIALLY AUTONOMOUSLY DRIVING MOTOR VEHICLE AND A PEDESTRIAN BY MEANS OF A SYSTEM, AND SYSTEM

(71) Applicant: Daimler Truck AG, Leinfelden-Echterdingen (DE)

(72) Inventors: Janine Guenther, Leinfelden (DE); Nicolai Spohrer, Stuttgart (DE); Lucas Volkert, Tiefenbronn (DE); Florian Flerlage, Stuttgart (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 170 days.

(21) Appl. No.: 18/005,270

(22) PCT Filed: Jun. 16, 2021

(86) PCT No.: PCT/EP2021/066221
§ 371 (c)(1),
(2) Date: Jan. 12, 2023

(87) PCT Pub. No.: WO2022/012836
PCT Pub. Date: Jan. 20, 2022

(65) Prior Publication Data
US 2023/0267827 A1 Aug. 24, 2023

(30) Foreign Application Priority Data
Jul. 13, 2020 (DE) .................... 10 2020 004 192.2

(51) Int. Cl.
*G08G 1/005* (2006.01)
*G08G 1/16* (2006.01)
*H04W 4/44* (2018.01)

(52) U.S. Cl.
CPC .............. *G08G 1/005* (2013.01); *G08G 1/166* (2013.01); *H04W 4/44* (2018.02)

(58) Field of Classification Search
CPC .......... G08G 1/005; G08G 1/166; H04W 4/44
(Continued)

(56) References Cited

U.S. PATENT DOCUMENTS 8,253,589 B2    8/2012  Grimm et al.
10,599,155 B1 *  3/2020  Konrardy ............... G06N 3/045
(Continued)

FOREIGN PATENT DOCUMENTS

DE    10 2010 001 869 A1    8/2011
DE    10 2010 048 470 A1    8/2011
(Continued)

OTHER PUBLICATIONS

PCT/EP2021/066221, International Search Report dated Sep. 29, 2021 (Three (3) pages).
(Continued)

*Primary Examiner* — Kerri L McNally
(74) *Attorney, Agent, or Firm* — Crowell & Moring LLP

(57) ABSTRACT

A method for communication between an at least partially autonomously driving motor vehicle and a pedestrian by a system includes detecting a presence of the pedestrian by detecting a presence of a mobile receiving device of the system on the pedestrian by the at least partially autonomously driving motor vehicle by a communication device of the at least partially autonomously driving motor vehicle. Depending on the detecting of the presence of the pedestrian, a first communication signal is transmitted from the at least partially autonomously driving motor vehicle to the mobile receiving device. A second communication signal is transmitted from the mobile receiving device to the communication device of the at least partially autonomously
(Continued)

driving motor vehicle. The second communication signal is taken into account by the at least partially autonomously driving motor vehicle during an autonomous driving operation of the at least partially autonomously driving motor vehicle.

10 Claims, 1 Drawing Sheet

(58) Field of Classification Search
USPC .......................................................... 340/944
See application file for complete search history.

(56) References Cited

U.S. PATENT DOCUMENTS

| | | | |
|---|---|---|---|
| 2013/0060400 A1* | 3/2013 | Hahne .................... | G08G 1/161 701/1 |
| 2015/0109148 A1* | 4/2015 | Cheatham, III ........ | G01S 11/12 340/944 |
| 2020/0142404 A1 | 5/2020 | Stroila | |
| 2020/0233414 A1* | 7/2020 | Akella ................... | G06V 20/58 |
| 2020/0249685 A1* | 8/2020 | Elluswamy .......... | G05D 1/0231 |
| 2020/0250439 A1* | 8/2020 | Vig ....................... | G05D 1/0246 |
| 2020/0276973 A1* | 9/2020 | Meijburg ......... | G08G 1/096816 |

FOREIGN PATENT DOCUMENTS

| | | |
|---|---|---|
| DE | 10 2011 111 899 A1 | 2/2013 |
| DE | 10 2014 218 429 A1 | 3/2016 |
| DE | 10 2014 219 148 A1 | 3/2016 |

OTHER PUBLICATIONS

German-language German Office Action issued in German application No. 10 2020 004 192.2 dated Jul. 1, 2021 (Six (6) pages).
German-language German Office Action issued in German application No. 10 2020 004 192.2 dated Sep. 23, 2021 (Five (5) pages).
Sewalkar et al., "Towards 802.11p-based Vehicle-to-Pedestrian Communication for Crash Prevention Systems", *2017 9th International Congress on Ultra Modern Telecommunications and Control Systems and Workshops (ICUMT)*, IEEE, Nov. 6, 2017, pp. 404-409, XP033297204.
Finkenzeller, Klaus, "RFID-Handbuch—Grundlagen und praktische Anwendungen von Transpondern, kontaktlosen Chipkarten und NFC", $6^{th}$, updated and expanded edition, Hanser, 2012, Title page + imprint + table of contents, (pp. V-XV) + pp. 17, 441-442, 575-578, German-language.

* cited by examiner

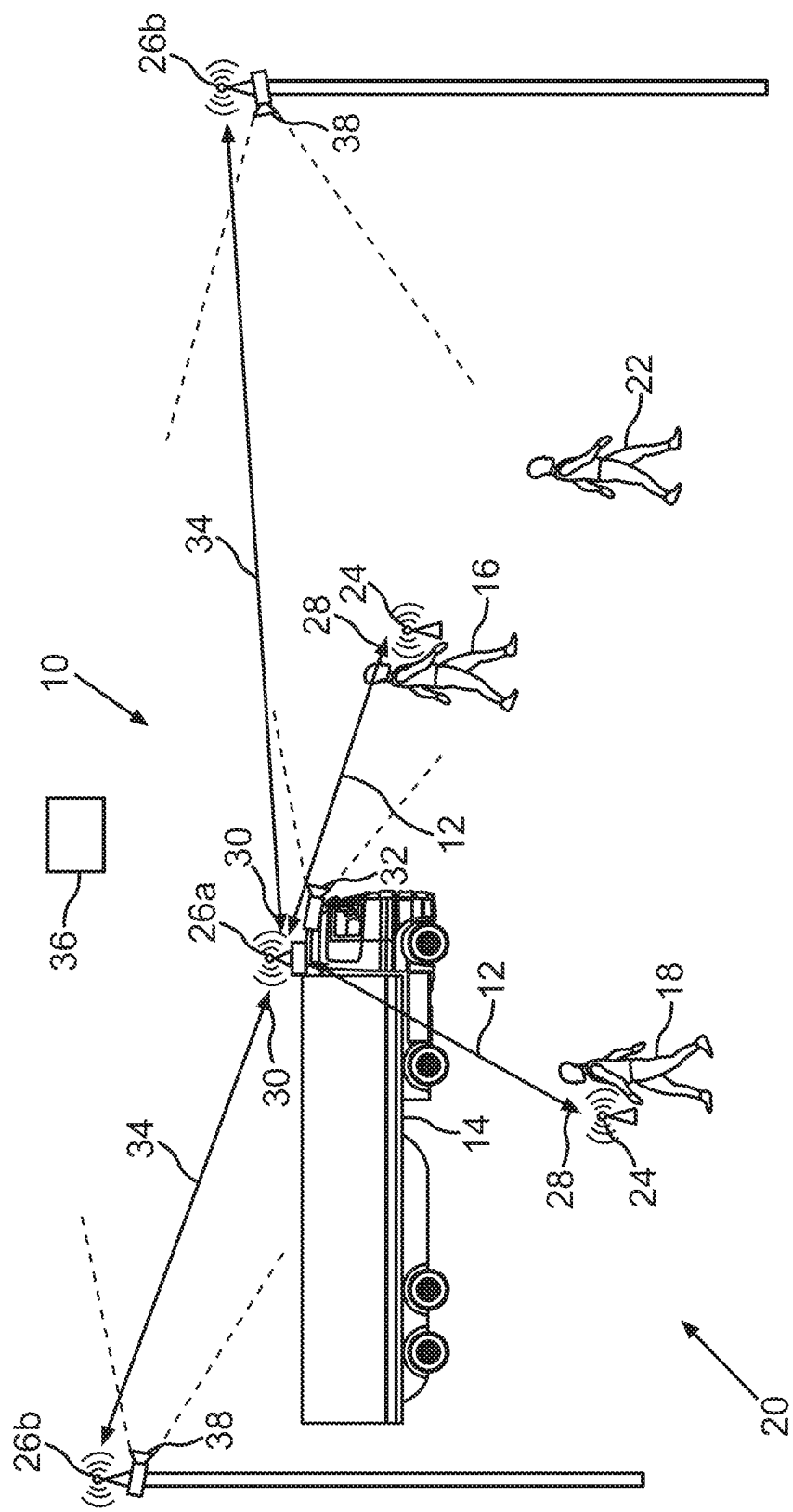

ically driving motor vehicle and a pedestrian by means of a system, and system

BACKGROUND AND SUMMARY OF THE INVENTION

The invention relates to a method for communication of an at least partially autonomously driving motor vehicle and a pedestrian by means of a system. The invention also relates to a system.

It is already known that autonomously driving motor vehicles, for example autonomously driving trucks, will be in circulation on roads in the future. These trucks may, for example, be designed as towing vehicles and may carry any number of trailers or semi-trailers, thus forming a set. It may then be provided that a corresponding coupling of the set takes place at so-called motorway hubs or depots. Such a hub is often a private, secured depot with exclusive access for self-driving trucks and their customers. For example, Level 4 motor vehicles, i.e., autonomously driving motor vehicles according to SAE standards, are operationally supported from such a hub.

Often, the missions of the self-driving trucks start and end in such a hub. The coordination of the self-driving trucks, the loading of the trailers and semi-trailers, maintenance and inspection often take place within these hubs. In the event of a technical defect in an autonomously driving truck, the hubs coordinate with a central electronic computing device to carry out the collection and recovery of the autonomously driving motor vehicle. Each hub provides the necessary maintenance, inspection, weighing, cleaning, refuelling, routine repair and calibration infrastructure needed to keep the trucks running. This often involves people, especially pedestrians, so that interaction must occur between the autonomously driving motor vehicles and the people.

DE 10 2010 001 869 A1 discloses a method and apparatus for warning a pedestrian of approaching vehicles which may pose a risk of collision for the pedestrian, in which the apparatus has a receiving device for electromagnetic radiation and by means of this receiving device an electromagnetic signal is received which is emitted by the vehicle from which the risk of collision may emanate and on detection of an imminent risk of collision the pedestrian is warned of the imminent collision by means of a warning signal which is emitted by a warning device fitted in the apparatus.

The object of the present invention is to provide a method and a system by means of which communication between at least one partially autonomously driving motor vehicle and a pedestrian can be improved.

One aspect of the invention relates to a method for communication of an at least partially autonomously driving motor vehicle and a pedestrian by means of a system, in which the presence of the pedestrian is detected by a detection of a presence of a mobile receiving device of the system on the pedestrian by the autonomously driving motor vehicle by means of a communication device of the at least partially autonomously driving motor vehicle and, depending on the detection, a communication signal is transmitted from the at least partially autonomously driving motor vehicle to the mobile receiving device of the pedestrian.

It is provided that a further communication signal is transmitted from the mobile receiving device to the communication device of the at least partially autonomously driving motor vehicle for communication and the further communication signal is taken into account by the at least partially autonomously driving motor vehicle during the at least partially autonomous driving operation.

This makes it possible for improved communication to be carried out between the pedestrian and the at least partially autonomously driving motor vehicle. In particular, for example, the partially autonomously driving motor vehicle can be informed whether the pedestrian is crossing a corresponding route of the at least partially autonomously driving motor vehicle. This can then in turn be taken into account by the at least partially autonomously driving motor vehicle, and for example a corresponding route adaptation of the motor vehicle can be carried out. Thus, the safety of the at least autonomously driving motor vehicle as well as the pedestrian can be increased.

The at least partially autonomously driving motor vehicle is in particular a so-called truck. In particular, the truck has at least a Level 4 automation according to the SAE standards. In other words, the motor vehicle has a high level of automation. The driving of the motor vehicle is permanently taken over by an electronic vehicle guidance system of the motor vehicle. If the driving tasks are no longer managed by the system, the driver can be requested to take over the driving.

In particular, the at least partially autonomously driving motor vehicle is technically designed in such a way that it can carry out journeys that are restricted to a specific domain. For example, for corresponding hub applications, the first step here is to assume an area of use, such as a motorway, highway or interstate. This has the consequence that the technical realisation can only deal with the conditions that occur in this domain. However, this does not include the mature interaction between humans and the at least partially autonomously driving motor vehicle that may occur in the more complex environment of a hub. According to the invention, for example, pedestrian crossings, workshop areas as well as transfer areas for trailers for coupling and uncoupling can now be operated in an improved manner. In order to realise the safe working environment in the hub in this respect, the system and method according to the invention is proposed, which realises the interaction between the human and the at least partially autonomously driving motor vehicle. If the paths of the pedestrian and the at least partially autonomously operated or driving motor vehicle cross in the hub, a communication is carried out between the participants confirming that they have seen each other and which of the two communication participants gives way to the other.

According to an advantageous embodiment, communication between the at least partially autonomously driving motor vehicle and the pedestrian is carried out in a partially delimited area. For example, the at least partially delimited area can be a so-called hub. The partially delimited area can also be completely delimited. The hub in turn can, as already mentioned, have, for example, pedestrian crossings, workshop areas as well as transfer areas for trailers for coupling and uncoupling. Within this hub, it is now provided that the communication between the pedestrian and the at least partially autonomously driving motor vehicle is carried out, as the paths between the pedestrian and the at least partially autonomously driving motor vehicle can cross in particular in this partially delimited area. Thus, improved communication between the pedestrian and the at least partially autonomously operated motor vehicle can be realised within the hub, so that the risk of an accident can be minimized.

Furthermore, it has proven to be advantageous if the mobile receiving device is provided as an access element of the pedestrian to the at least partially delimited area. For example, the access element can be an access card or a key card with which the pedestrian can gain access to the delimited area. This means that communication between the at least partially autonomous motor vehicle and the pedestrian can also be carried out by means of a single element, which is in particular already present on the pedestrian. In this way, communication between the at least partially autonomously operated motor vehicle and the pedestrian can be made possible with reduced effort.

Furthermore, it has proven to be advantageous if the mobile receiving device is provided as a transponder. The transponder can, for example, also be designed as an access element to the delimited area. In particular, it is already known from the prior art that a transponder can be used to provide pedestrians with appropriate access to delimited areas. Thus, communication between the at least partially moving motor vehicle and the pedestrian can be carried out with reduced effort and using existing means.

Furthermore, it has proven to be advantageous if the mobile receiving device has an actuating device and, when the pedestrian actuates the actuating device, a further communication signal is generated by a mobile receiving device and transmitted to the communication device and the further communication signal is taken into account by the at least partially autonomously driving motor vehicle during the at least partially autonomous driving operation. In particular, for example, the pedestrian can thus communicate to the at least partially autonomously driving motor vehicle that the pedestrian has detected the at least partially autonomously driving motor vehicle. In particular, the pedestrian may actively communicate that the pedestrian has detected the at least partially autonomously driving motor vehicle. For example, if there is no active actuation of the pedestrian, the at least partially autonomously driving motor vehicle may exercise increased caution when encountering the pedestrian. The actuation element may, for example, be designed as a button on the mobile receiving device, in particular on a transponder. Furthermore, it may be provided, for example, that by actuating the button a safe interaction between the pedestrian and the at least partially autonomously driving motor vehicle may be realised, wherein by pressing the button it may be communicated, for example, to the at least partially autonomously driving motor vehicle that the paths between the pedestrian and the at least partially autonomously driving motor vehicle may cross. As soon as the at least partially autonomously driving motor vehicle has detected this information, for example, a further signal, for example a flashing or a honking of the at least partially autonomously driving motor vehicle, can be realised so that the pedestrian can again be informed that the at least partially autonomously driving motor vehicle has also detected him and either requests him to wait or, for example, allows him to cross. Thus, the communication between the at least partially autonomously driving motor vehicle and the pedestrian can be improved.

Furthermore, it has proven advantageous if the pedestrian is additionally detected by the at least partially autonomously driving motor vehicle by means of a detection device of the at least partially autonomously driving motor vehicle. For example, the detection device can be designed as a lidar sensor device and/or as a camera and/or as a radar sensor device and/or as an ultrasonic sensor device. In particular, an additional detection of the pedestrian can be realised, whereby a redundant possibility is created to improve the detection of the pedestrian.

In a further advantageous embodiment, if a pedestrian is detected by the detection device and a presence of the mobile receiving device is not detected by means of the communication device, a warning signal is transmitted by means of the communication device to a central electronic computing device of the system. For example, if the pedestrian does not have the mobile receiving device, the pedestrian might be an unauthorized person within the delimited area. Thus, if the at least partially autonomously driving motor vehicle detects the pedestrian but does not receive a corresponding communication signal from the mobile receiving device, it can be assumed that the pedestrian has unauthorized access. This unauthorized access can then in turn be transmitted to the central electronic computing device, whereby appropriate countermeasures can be initiated.

Furthermore, it has proven advantageous if the presence of a pedestrian is additionally detected by means of a further detection device of the system. For example, the system, especially within the delimited area, in other words within the hub, can have cameras or laser barriers, for example, and thus can additionally detect the presence of the pedestrian. Then again, if the at least partially autonomously driving motor vehicle does not confirm receiving the communication signal, the system may assume that the pedestrian is an unauthorized pedestrian. In this way, intruders within the delimited area can be reliably prevented.

According to a further advantageous embodiment, a warning signal is generated for the pedestrian by means of the mobile receiving device as soon as the communication signal is received by the mobile receiving device. For example, the mobile receiving device can have a vibration device, with a vibration then being generated for the pedestrian to perceive as soon as the at least partially autonomous motor vehicle has transmitted the communication signal to the mobile receiving device. Thus, the pedestrian can be informed that an at least partially autonomously driving motor vehicle is in their immediate vicinity, whereby the pedestrian can be warned of its presence. Thus, the risk of an accident within the delimited area can be minimized.

Another aspect of the invention relates to a system for performing a communication of an at least partially autonomously driving motor vehicle and a pedestrian with at least one mobile receiving device, the system being designed to perform a method according to the preceding aspect. In particular, the method is performed by means of the system.

Advantageous embodiments of the method are to be regarded as advantageous embodiments of the system. For this purpose, the system has objective features which allow the method and an advantageous embodiment thereof to be carried out.

Further advantages, features and details of the invention will become apparent from the following description of a preferred exemplary embodiment and from the drawing. The features and combinations of features mentioned above in the description as well as the features and combinations of features mentioned below in the description of the FIGURE and/or shown alone in the single FIGURE can be used not only in the combination indicated in each case, but also in other combinations or on their own, without departing from the scope of the invention.

BRIEF DESCRIPTION OF THE DRAWING

The single FIGURE shows a schematic side view of an embodiment of a system.

DETAILED DESCRIPTION OF THE DRAWING

In the FIGURE, identical or functionally identical elements are provided with the same reference signs.

The FIGURE shows a schematic side view of an embodiment of a system 10 for communication 12 between an at least partially autonomously driving motor vehicle 14, which is designed in particular as a truck, and a pedestrian 16, 18. In particular, two pedestrians 16, 18 are shown here, in particular a first pedestrian 16 and a second pedestrian 18. The first pedestrian 16 and the second pedestrian 18 are, for example, authorized persons for a delimited area 20, for example for a hub. Furthermore, a third pedestrian 22 is shown. No communication 12 is shown between the third pedestrian 22 and the at least partially autonomously driving motor vehicle 14. The third pedestrian 22 may, for example, be an intruder or an unauthorized person within the delimited area 20.

In the method of communication 12 between the at least partially autonomously driving motor vehicle 14 and the pedestrian 16, 18 by means of the system 10, the presence of the pedestrian 16, 18 is detected by the autonomously driving motor vehicle 14 by means of a communication device 26a of the at least partially autonomously driving motor vehicle 14 for detecting a presence of a mobile receiving device 24 of the system 10 at the pedestrian 16, 18, and, in dependence on the detection, a communication signal 28 is transmitted from the at least partially autonomously driving motor vehicle 14 to the mobile receiving device 24.

It is provided that a further communication signal 30 is transmitted from the mobile receiving device 24 to the communication device 26a of the at least partially autonomously driving motor vehicle 14 for communication 12, and the further communication signal 30 is taken into account by the at least partially autonomously driving motor vehicle 14 during the at least partially autonomous driving operation.

In particular, it may be provided that the communication 12 between the at least partially autonomously driving motor vehicle 14 and the pedestrian 16, 18 is carried out in an at least partially delimited area 20, and this partially delimited area 20 may also be referred to as a hub. The mobile receiving device 24 can be provided here as an access element of the pedestrian 16, 18 to the at least partially delimited area 20. Furthermore, the mobile receiving device 24 can also be provided as a transponder.

It may further be provided that the mobile receiving device 24 comprises an actuating device and, when the pedestrian 16, 18 operates or actuates the actuating device, a further communication signal is generated by the mobile receiving device 24 and transmitted to the communication device 26a and the further communication signal is taken into account by the at least partially autonomously driving motor vehicle 14 during the at least partially autonomous driving operation.

It may further be provided that the pedestrian 16, 18 is additionally detected by the at least partially autonomously driving motor vehicle 14 by means of a detection device 32 of the at least partially autonomously driving motor vehicle 14. It may then be provided, for example, that if a pedestrian 16, 18 is detected by means of the detection device 32 and if a presence of the mobile receiving device 24 is not detected, as represented for example by the third person 22, a warning signal 34 is transmitted by means of the communication device 26a to a central electronic computing device 36 of the system 10. In particular, for this purpose, for example, the system 10 can have corresponding communication devices 26b so that the warning signal 34 can be received.

Furthermore, it can be provided that the presence of the pedestrian 16, 18 is additionally detected by means of a further detection device 38 of the system 10. By means of the mobile receiving device 24, a warning signal can also be generated for the pedestrian 16, 18 as soon as the communication signal 28 is received by the mobile receiving device 24.

In particular, it is thus described that each employee in the delimited area 20, which is represented in particular by the first person 16 and the second person 18, can be equipped with a corresponding transponder so that the at least partially autonomously driving motor vehicle 14 can identify the pedestrians 16, 18 as humans at any time. This transponder can, for example, be coupled with usual access controls, for example by means of an access card or a key card. As soon as the pedestrian 16, 18 is in the vicinity of the at least partially autonomously driving motor vehicle 14, this is detected and an exchange of information is enabled. For a safe interaction, it is possible, for example, to inform the at least partially autonomously driving motor vehicle 14 via the transponder, for example by pressing the actuating device, which for example may be a button, that the pedestrians 16, 18 are likely to cross the paths of the at least partially autonomously driving motor vehicle 14. As soon as the at least partially autonomously driving motor vehicle 14 has detected the information, a further communication signal is exchanged, for example the vibration of the transponder or a flashing or honking of the at least partially autonomously driving motor vehicle 14, so that the pedestrian 16, 18 can be informed that the at least partially autonomously driving motor vehicle 14 has also detected them and either requests them to wait or allows them to cross.

In addition to the safe interaction between the at least partially autonomously driving motor vehicle 14 and the pedestrians 16, 18, for example, the mobile receiving device 24 of the authorized employees can be used to identify unwanted intruders, which is represented in particular by the third person 22, in the hub when a comparison is made between the transmission signal and monitoring data of the delimited area 20. A monitoring system, represented in particular by the further detection device 38, which can detect, for example, the third person 22, for example in a camera-based manner via laser barriers or FLIR, can match these data with the available transmission signals of the authorized employees and can thus determine whether unauthorized persons are present in the delimited area 20. In the same context, a comparison can be made between the sensor data of the at least partially autonomously driving motor vehicle 14 and the transmission signals. If the sensor system of the at least partially autonomously driving motor vehicle 14 detects the third pedestrian 22 who is not carrying a receiving device 24, an alarm is also triggered.

In particular, a lower demand on the sensor system of the at least partially autonomously driving motor vehicle 14 can be realised. Furthermore, an avoidance of accidents which would result for example from faulty detection can be realised. In particular, the system 10 is independent of weather conditions with regard to detection, and overlooking of pedestrians 16, 18 can be prevented, for example if they are in the blind area of the at least partially autonomously driving motor vehicle 14. Furthermore, a safe interaction between the employees of the delimited area 20 and the at least partially autonomously driving motor vehicle 14 can be realised. Furthermore, an automated detection of unauthorized persons and thus an increase in security within the delimited area 20 can be realised.

Overall, the invention demonstrates safe interaction between humans and autonomous vehicles, as well as detection of unauthorized persons.

The invention claimed is:

1. A method for communication (12) between an at least partially autonomously driving motor vehicle (14) and a pedestrian (16, 18) by a system (10), comprising the steps of:
    detecting a presence of the pedestrian (16, 18) by detecting a presence of a mobile receiving device (24) of the system (10) on the pedestrian (16, 18) by the at least partially autonomously driving motor vehicle (14) by a communication device (26a) of the at least partially autonomously driving motor vehicle (14);
    depending on the detecting of the presence of the pedestrian (16, 18), transmitting a first communication signal (28) from the at least partially autonomously driving motor vehicle (14) to the mobile receiving device (24) on the pedestrian (16, 18);
    transmitting a second communication signal (30) from the mobile receiving device (24) to the communication device (26a) of the at least partially autonomously driving motor vehicle (14); and
    taking the second communication signal (30) into account by the at least partially autonomously driving motor vehicle (14) during an at least partially autonomous driving operation of the at least partially autonomously driving motor vehicle (14);
    wherein the communication (12) is carried out between the at least partially autonomously driving motor vehicle (14) and the pedestrian (16, 18) in an at least partially delimited area (20);
    wherein the mobile receiving device (24) is an access element to the at least partially delimited area (20).

2. The method according to claim 1, wherein the access element is a transponder.

3. The method according to claim 1, wherein the mobile receiving device (24) has an actuating device, and further comprising the steps of:
    actuating the actuating device by the pedestrian (16, 18);
    in response to the actuating, generating a third communication signal by the mobile receiving device (24) and transmitting the third communication signal to the communication device (26a); and
    taking the third communication signal into account by the at least partially autonomously driving motor vehicle (14) during the at least partially autonomous driving operation.

4. The method according to claim 1, further comprising the step of detecting the pedestrian (16, 18) by the at least partially autonomously driving motor vehicle (14) by a detection device (32) of the at least partially autonomously driving motor vehicle (14).

5. The method according to claim 4, further comprising the step of transmitting a warning signal (34) by the communication device (26a) to a central electronic computing device (36) of the system (10) when the pedestrian (16, 18) is detected by the detection device (32) and a presence of the mobile receiving device (24) is not detected by the communication device (26a).

6. The method according to claim 1, further comprising the step of detecting the presence of the pedestrian (16, 18) by a detection device (38) of the system (10).

7. The method according to claim 1, further comprising the step of generating a warning signal for the pedestrian (16, 18) by the mobile receiving device (24) as soon as the first communication signal (28) is received by the mobile receiving device (24).

8. A system (10) that is configured to perform the method according to claim 1.

9. A method for communication (12) between an at least partially autonomously driving motor vehicle (14) and a pedestrian (16, 18) by a system (10), comprising the steps of:
    detecting a presence of the pedestrian (16, 18) by detecting a presence of a mobile receiving device (24) of the system (10) on the pedestrian (16, 18) by the at least partially autonomously driving motor vehicle (14) by a communication device (26a) of the at least partially autonomously driving motor vehicle (14), wherein the mobile receiving device (24) has an actuating device;
    depending on the detecting of the presence of the pedestrian (16, 18), transmitting a first communication signal (28) from the at least partially autonomously driving motor vehicle (14) to the mobile receiving device (24) on the pedestrian (16, 18);
    transmitting a second communication signal (30) from the mobile receiving device (24) to the communication device (26a) of the at least partially autonomously driving motor vehicle (14);
    taking the second communication signal (30) into account by the at least partially autonomously driving motor vehicle (14) during an at least partially autonomous driving operation of the at least partially autonomously driving motor vehicle (14);
    actuating the actuating device by the pedestrian (16, 18);
    in response to the actuating, generating a third communication signal by the mobile receiving device (24) and transmitting the third communication signal to the communication device (26a); and
    taking the third communication signal into account by the at least partially autonomously driving motor vehicle (14) during the at least partially autonomous driving operation.

10. A method for communication (12) between an at least partially autonomously driving motor vehicle (14) and a pedestrian (16, 18) by a system (10), comprising the steps of:
    detecting a presence of the pedestrian (16, 18) by detecting a presence of a mobile receiving device (24) of the system (10) on the pedestrian (16, 18) by the at least partially autonomously driving motor vehicle (14) by a communication device (26a) of the at least partially autonomously driving motor vehicle (14);
    depending on the detecting of the presence of the pedestrian (16, 18), transmitting a first communication signal (28) from the at least partially autonomously driving motor vehicle (14) to the mobile receiving device (24) on the pedestrian (16, 18);
    transmitting a second communication signal (30) from the mobile receiving device (24) to the communication device (26a) of the at least partially autonomously driving motor vehicle (14);
    taking the second communication signal (30) into account by the at least partially autonomously driving motor vehicle (14) during an at least partially autonomous driving operation of the at least partially autonomously driving motor vehicle (14);
    detecting the pedestrian (16, 18) by the at least partially autonomously driving motor vehicle (14) by a detection device (32) of the at least partially autonomously driving motor vehicle (14); and
    transmitting a warning signal (34) by the communication device (26a) to a central electronic computing device

(36) of the system (10) when the pedestrian (16, 18) is detected by the detection device (32) and a presence of the mobile receiving device (24) is not detected by the communication device (26a).

\* \* \* \* \*